United States Patent [19]

Hamilton

[11] Patent Number: 5,519,501
[45] Date of Patent: May 21, 1996

[54] PROOFING IMAGES IN A PRINT JOB HAVING AT LEAST ONE IMAGE IN A PRINT JOB HAVING AT LEAST ONE IMAGE FOR PRINTING ON TAB STOCK

[75] Inventor: Robert S. Hamilton, Webster, N.Y.

[73] Assignee: Xerox Corporation, Stamford, Conn.

[21] Appl. No.: 79,497

[22] Filed: Jun. 21, 1993

[51] Int. Cl.⁶ .................. H04N 1/21; H04N 1/393
[52] U.S. Cl. .................... 358/296; 358/451; 358/452; 358/453
[58] Field of Search .................. 358/444, 451, 358/452, 453, 537, 538, 296, 449; 355/218, 319

[56] References Cited

U.S. PATENT DOCUMENTS

| | | | |
|---|---|---|---|
| 4,674,864 | 6/1987 | Stakenborg et al. | 355/28 |
| 4,702,589 | 10/1987 | Ito | 355/319 |
| 4,731,658 | 3/1988 | Koseki | 358/451 X |
| 4,745,441 | 5/1988 | Maruta et al. | 355/218 |
| 4,819,029 | 4/1989 | Ito | 355/218 |
| 5,057,937 | 10/1991 | Muramatsu et al. | 358/451 X |
| 5,159,395 | 10/1992 | Farrell et al. | 355/319 |
| 5,210,622 | 5/1993 | Kelley et al. | 358/451 |

*Primary Examiner*—Peter S. Wong
*Assistant Examiner*—Randy W. Gibson
*Attorney, Agent, or Firm*—Oliff & Berridge

[57] ABSTRACT

A printing system for printing on output sheets has a proof mode for proofing images requiring printing on tab stock. The images previously unable to be proofed are proofed on either two sheets of standard output stock or a single sheet of standard output stock. To proof an image on two sheets of standard output stock, a first part of the image is printed on one sheet and a second part of the image is printed on another sheet. When the two sheets are aligned accordingly, the image is shown in totality. To proof an image on a single sheet, the image is scaled. The images for printing on standard output stock are stored temporarily in the system memory for printing. Bitmaps are created and stored temporarily for applying tab-edge artwork to show the tab area and location of the tab area.

37 Claims, 19 Drawing Sheets

PROOFING IMAGES IN A PRINT JOB HAVING AT LEAST ONE IMAGE IN A PRINT JOB HAVING AT LEAST ONE IMAGE FOR PRINTING ON TAB STOCK

BACKGROUND OF THE INVENTION

1. Field of the Invention

The present invention relates to a printing system for proofing the printing of a print job. In particular, the present invention relates to proofing the printing of images that are to be printed on tab stock.

2. Description of the Related Art

Current printing systems are capable of printing a print job using output documents corresponding to the image to be printed thereon. For example, when a shifted image or a tab master for printing a tab appears in a print job, the output stock for these images will be tab stock. Presently, when the user attempts to proof a print job or image that requires tab output stock, the system will indicate on a display that the system cannot proof tab stock and the proof job will stop. Unfortunately, proofing a print job with tab stock is impossible and standard printing must be used. The user must therefore print on expensive custom tab stock to determine whether the print job is correct and as desired. This is an inefficient waste of resources.

Accordingly, there is a need to be able to proof a print job including tab images for printing on tab stock. The invention overcomes this problem by enabling proofing of a print job requiring tab stock. Further, the invention allows the proofing of tab images on standard output stock thereby diminishing waste and costs.

U.S. Pat. No. 5,210,622 to Kelley et al. discloses an example of an electronic reprographic printing system that has an automatic variable image shift for precut tabs and that prints varying image shifts on output sheets having varying dimensions, in particular, tab stock.

SUMMARY OF THE INVENTION

Accordingly, it is an object of the invention to provide a printing system that is capable of proofing a print job that includes tab images for printing on tab stock.

Another object of the invention is to provide proofing of a tab image on standard output stock.

Another object of the invention is to provide the user with a printout on standard output stock that allows the operator to check whether information on the tab is properly located and positioned.

These and other objects are accomplished by providing a printing system for proofing a print job including images for printing on tab stock. Further, the invention provides for proofing the tab images on standard output stock. The system includes a memory for electronically storing the images, including tab images, of a print job, and a proof mode for proofing the images for printing on tab stock by printing the electronic images on standard output stock. The system is capable of printing a tab image on one or two sheets of standard output stock so that the user can proof an entire print job including a tab image.

BRIEF DESCRIPTION OF THE DRAWINGS

The foregoing and other objects, features and advantages of the invention will be apparent from the following more particular description of preferred embodiments of the invention, as illustrated in the accompanying drawings, wherein.

DETAILED DESCRIPTION OF PREFERRED EMBODIMENTS

The instant invention can be used in any type of reproduction or printing system, but for purposes of illustration, the following description describes the invention in connection with a printing system.

A. The System

Figure 1:
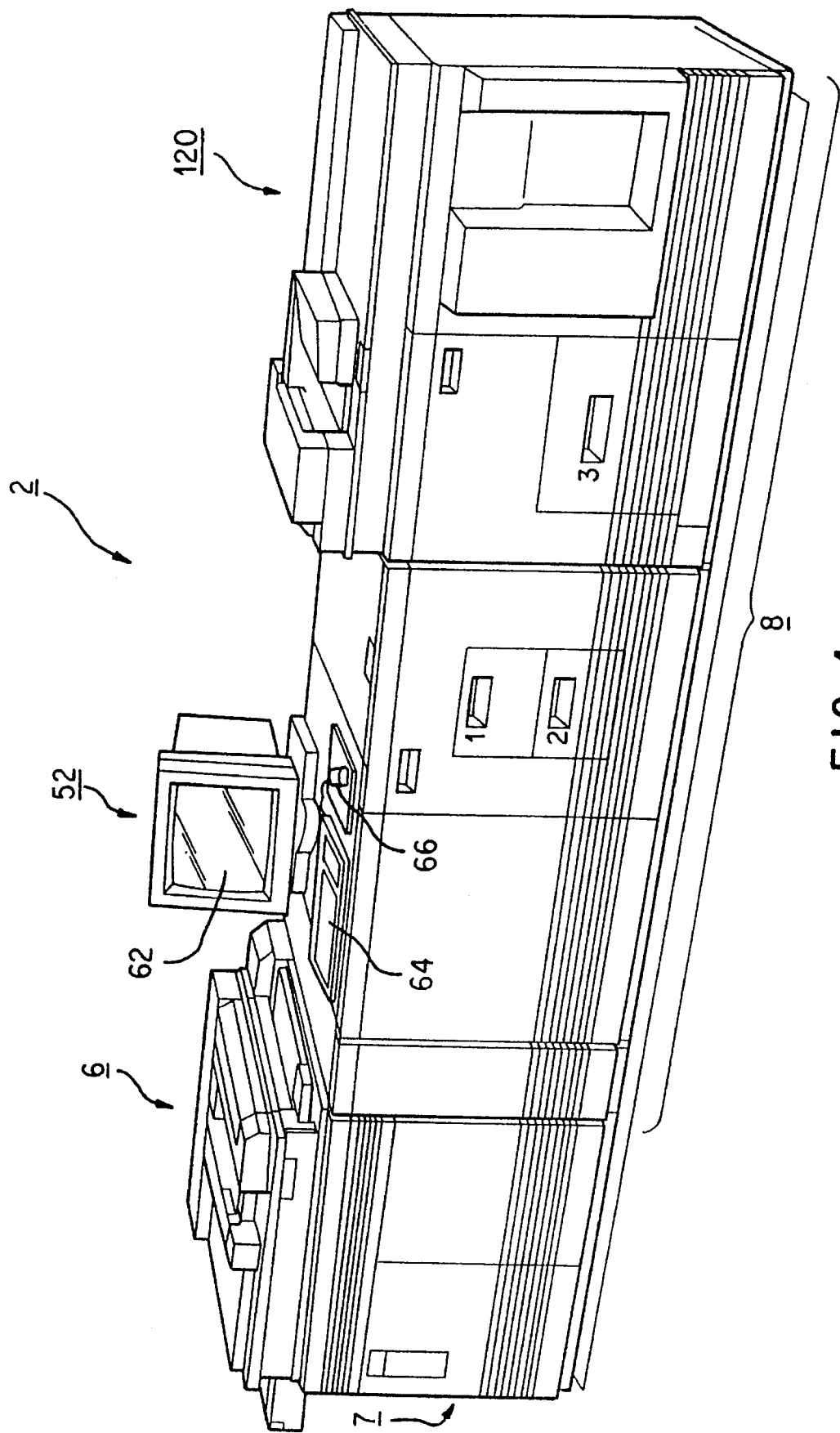
FIG. 1 is a view depicting an electronic printing system incorporating the print media identification system of the present invention.
Figure 2:
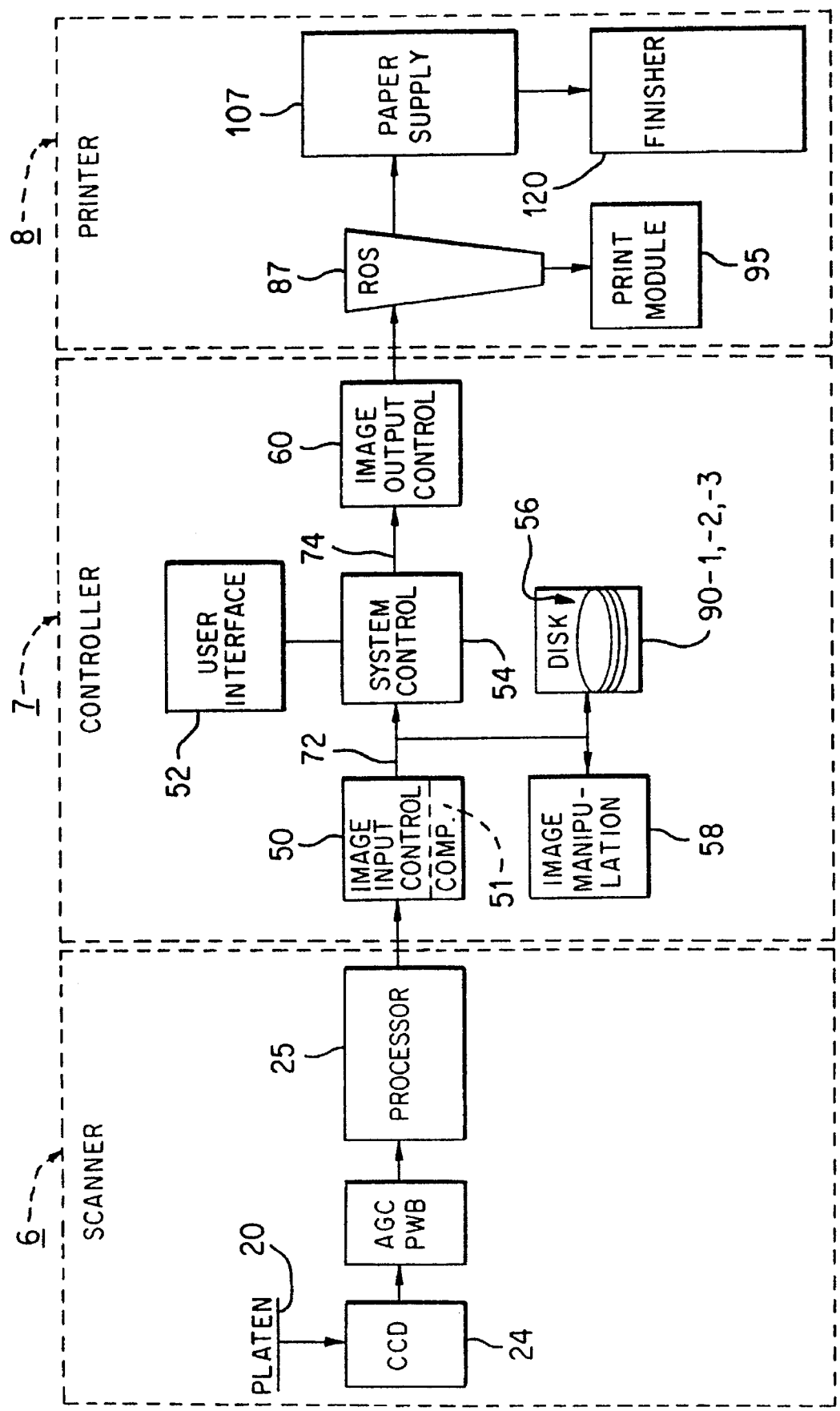
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
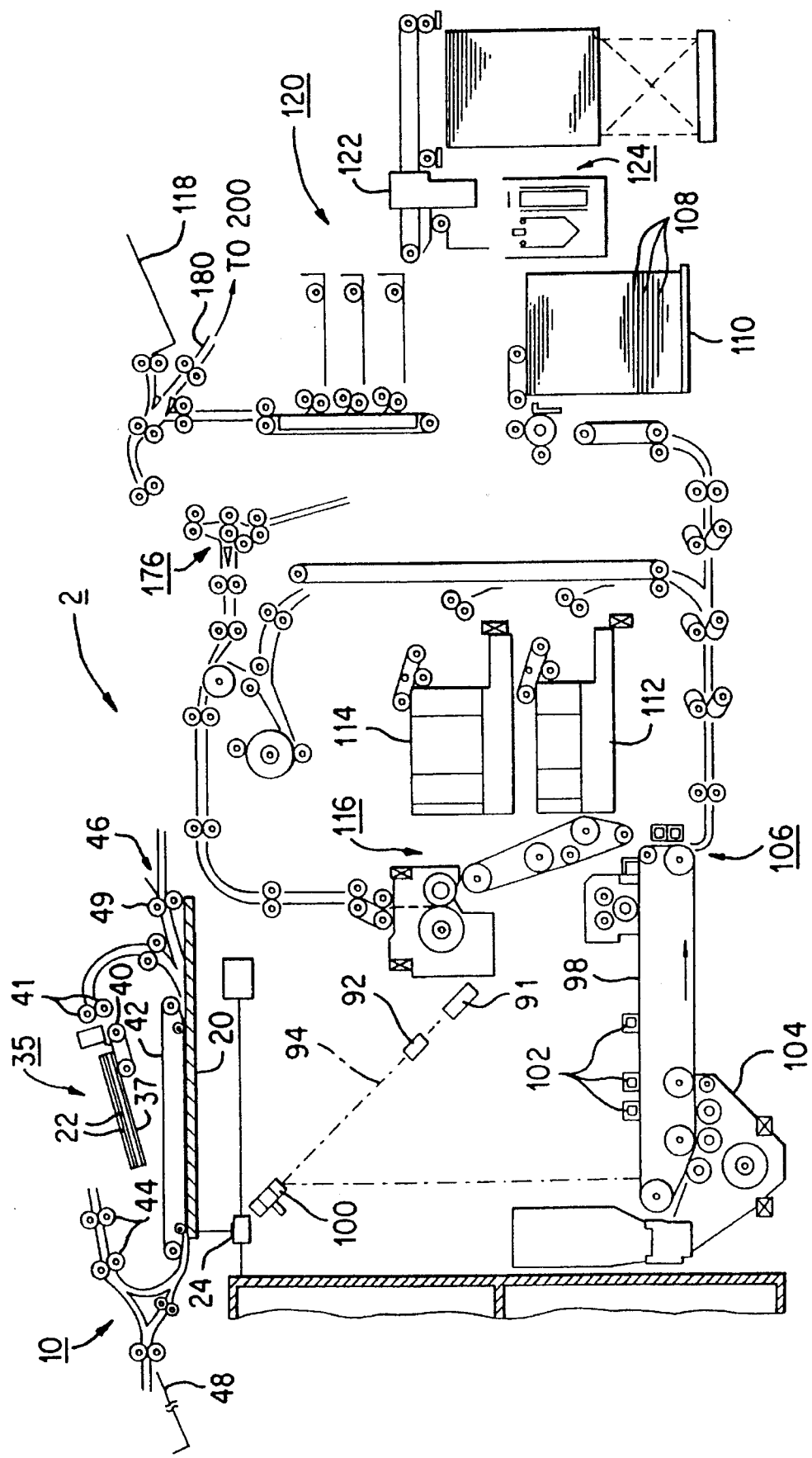
FIG. 3 is a plan view illustrating the principal mechanical components of the printing system shown in FIG. 1.
Figure 4:
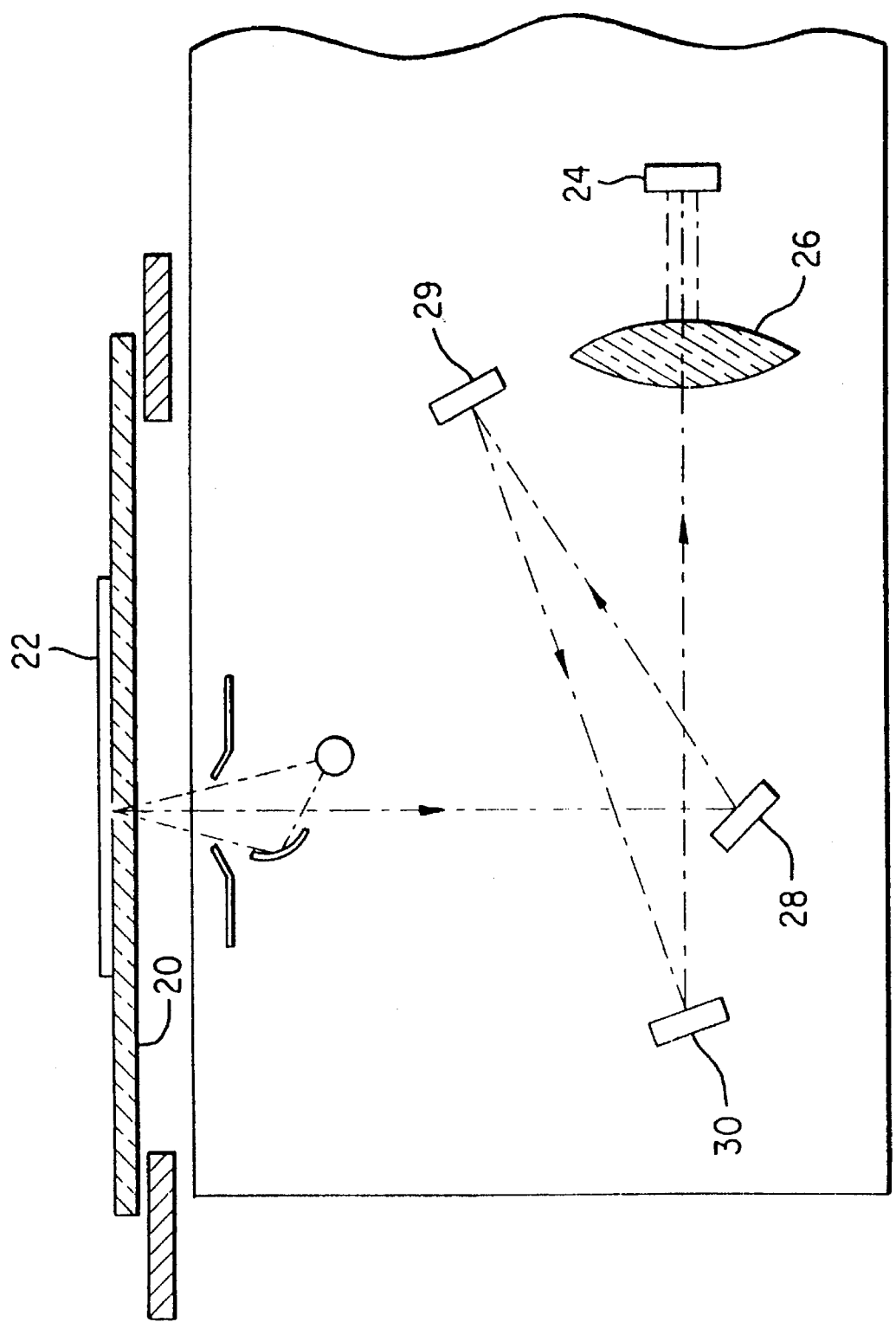
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on plate 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 24 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
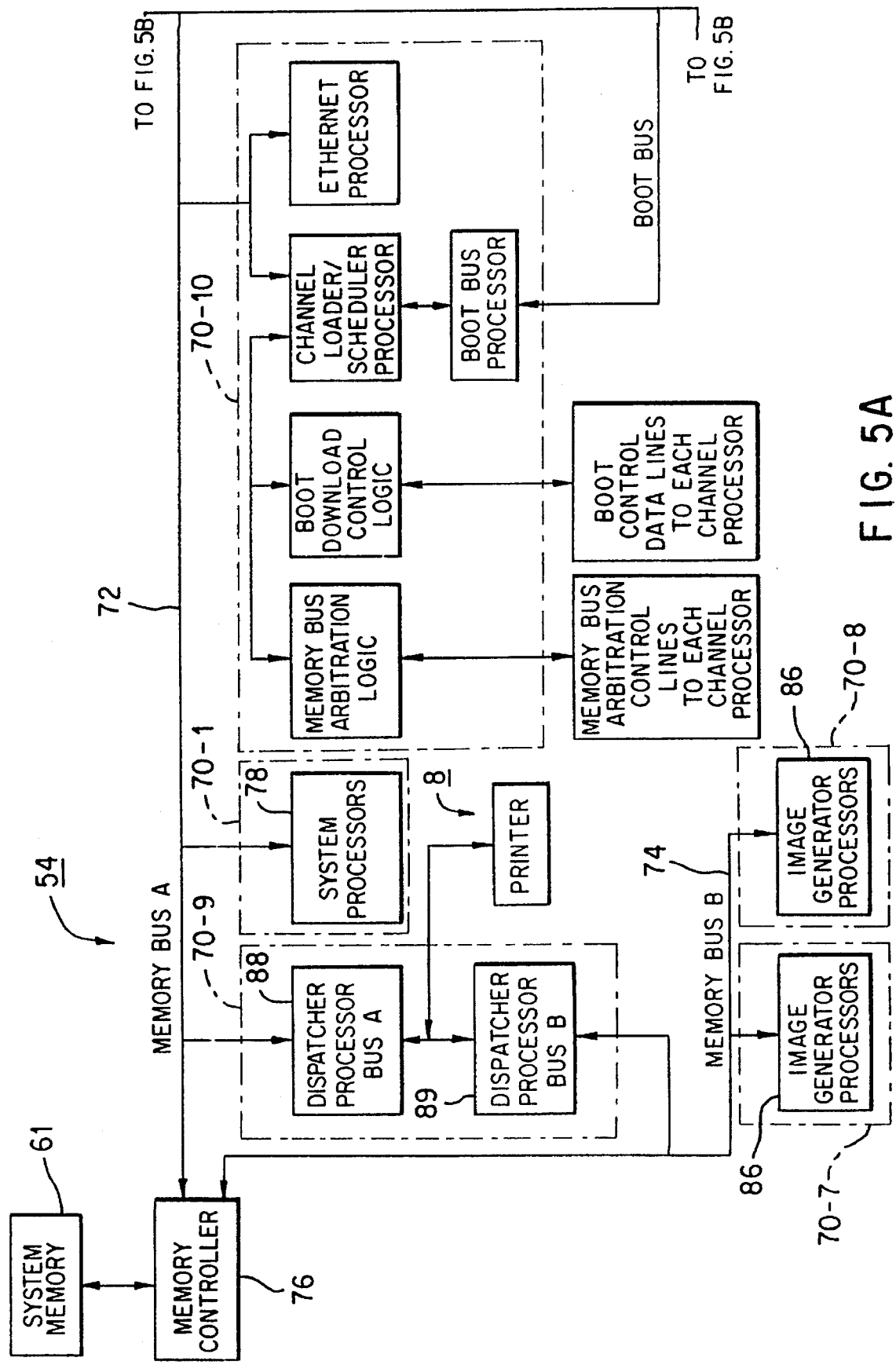
FIGS. 5a, 5b and 5c comprise a schematic block diagram showing the major parts of the control section for the printing system shown in FIG. 1.
Figure 5B:
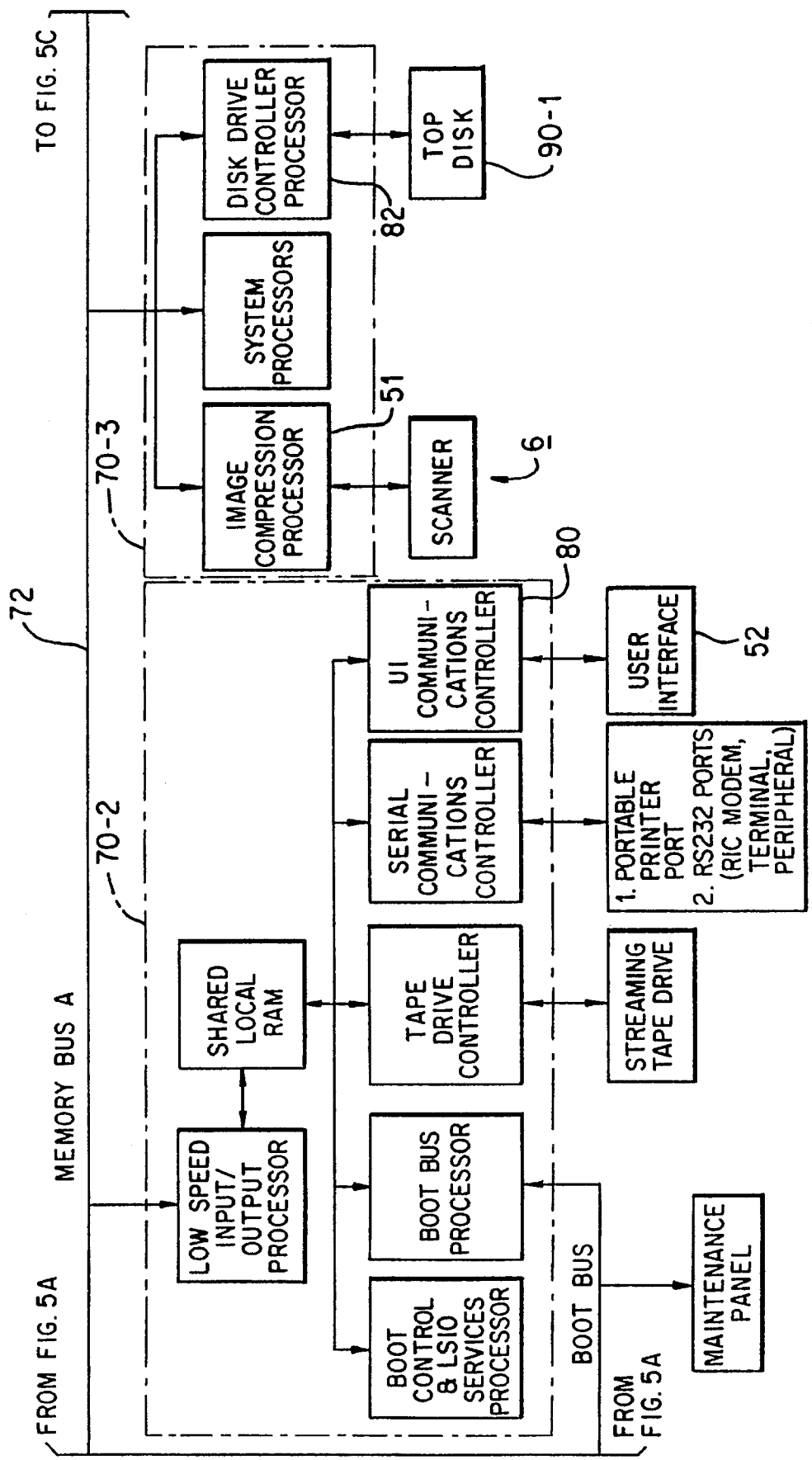
Figure 5C:
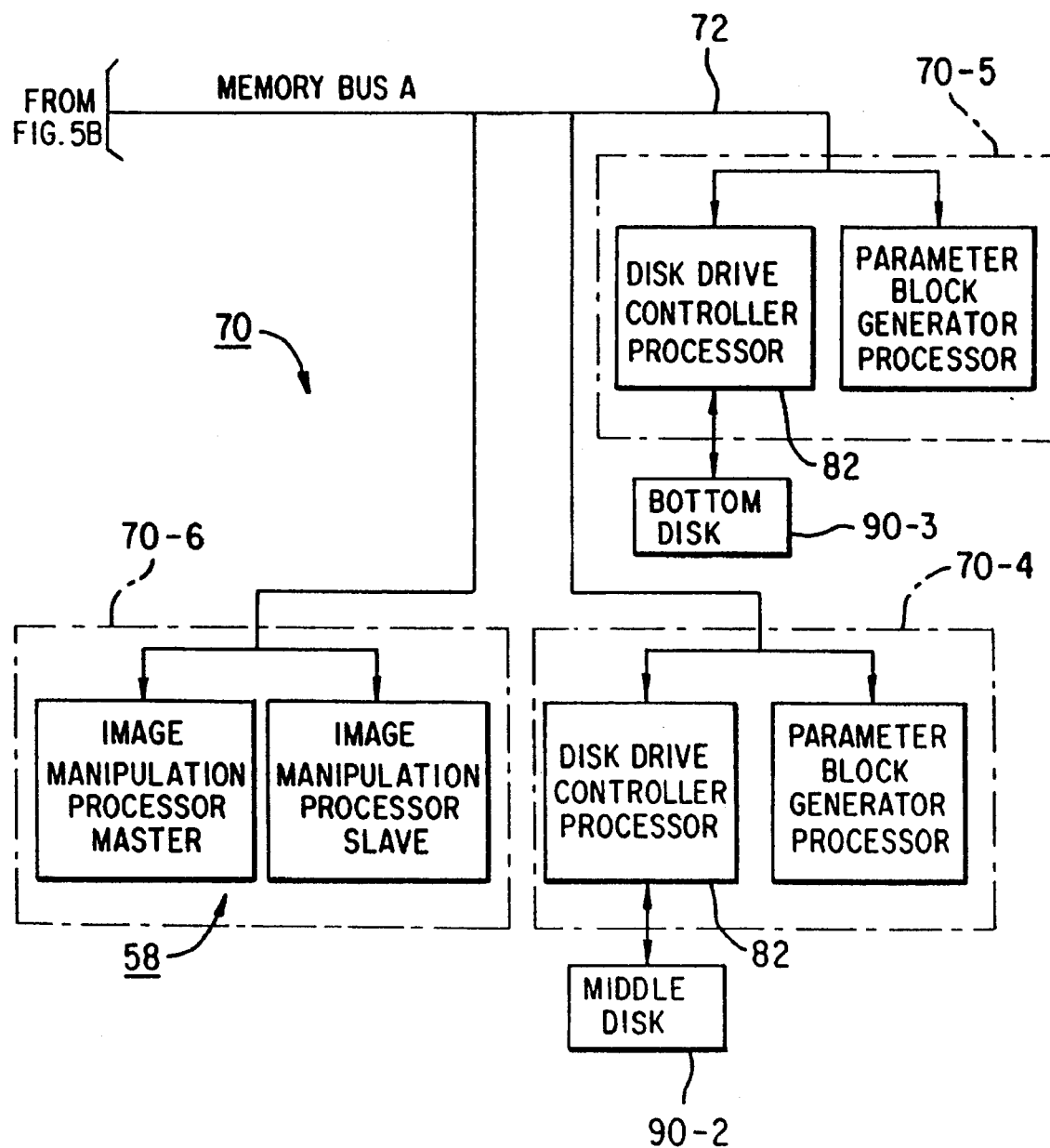

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
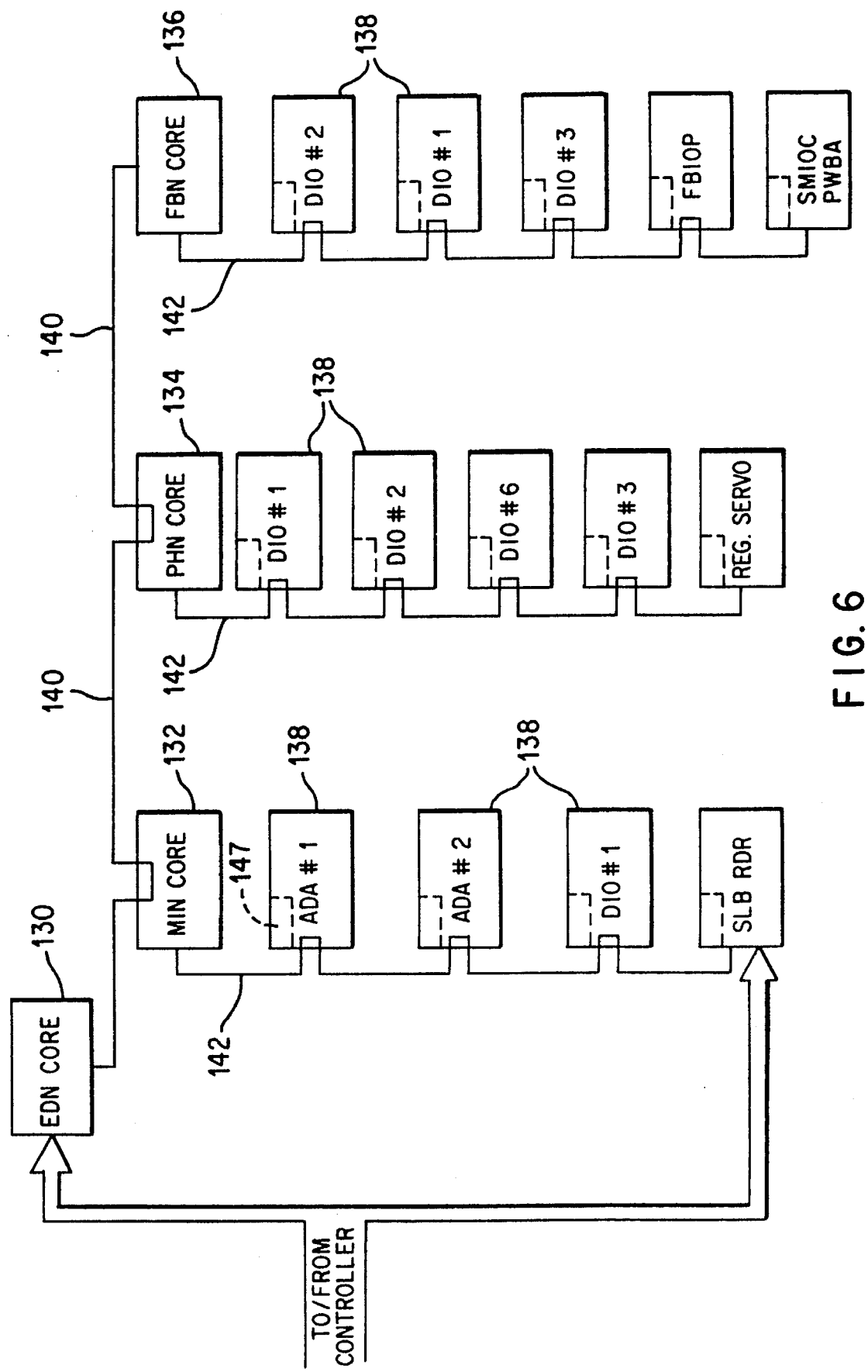
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Image Shifting

The following description of printing a tab image on tab output stock is for purposes of illustration and is in no way intended to limit the scope of the invention.

Either before or after an electronic image has been created (e.g. by scanning a document at the scanner 6), the system operator must specify which electronic image or original document is to receive the variable image shift. When printing on tabs for example the system operator can input that the output stock is to be a tab at the UI 52 within controller 7. The system operator can specify a tab before scanning, scan the document to create an electronic image, print the electronic image on a tab, and then respecify the output stock to be a standard output page for the remainder of the scan block. By specifying a tab, the controller 7 automatically applies an image shift to the electronic image.

In the alternative, the system operator can scan the entire scan block initially, and then select via User Interface 52 particular electronic images to be printed on different sized output stock (i.e. with variable image shift). In this mode, the system operator reviews the electronic images on the User Interface and specifies the specific type of output stock, such as a full cut or precut tab, and may additionally input the specific dimensions of the input and output stock.

The sizes of the original documents and the sizes of the output documents must be specified since the degree of image shift is dependent upon the difference between the sizes of the input and output documents. If desired, it is possible to preprogram default parameters wherein the controller 7 automatically specifies sizes of the input and output documents in the event the system operator fails to input this information.

One benefit of having a size dependent image shift, such as for tabs, is that the entire print job can be scanned at one time. It is not necessary, therefore, to scan separately the pages comprising the print job and the pages to be printed on tabs. With the special image shift for tabs, all the original documents can be quickly and efficiently scanned from standard sized pages, even though the output document comprises pages of different sizes with different degrees of image shifting.

Figure 8:
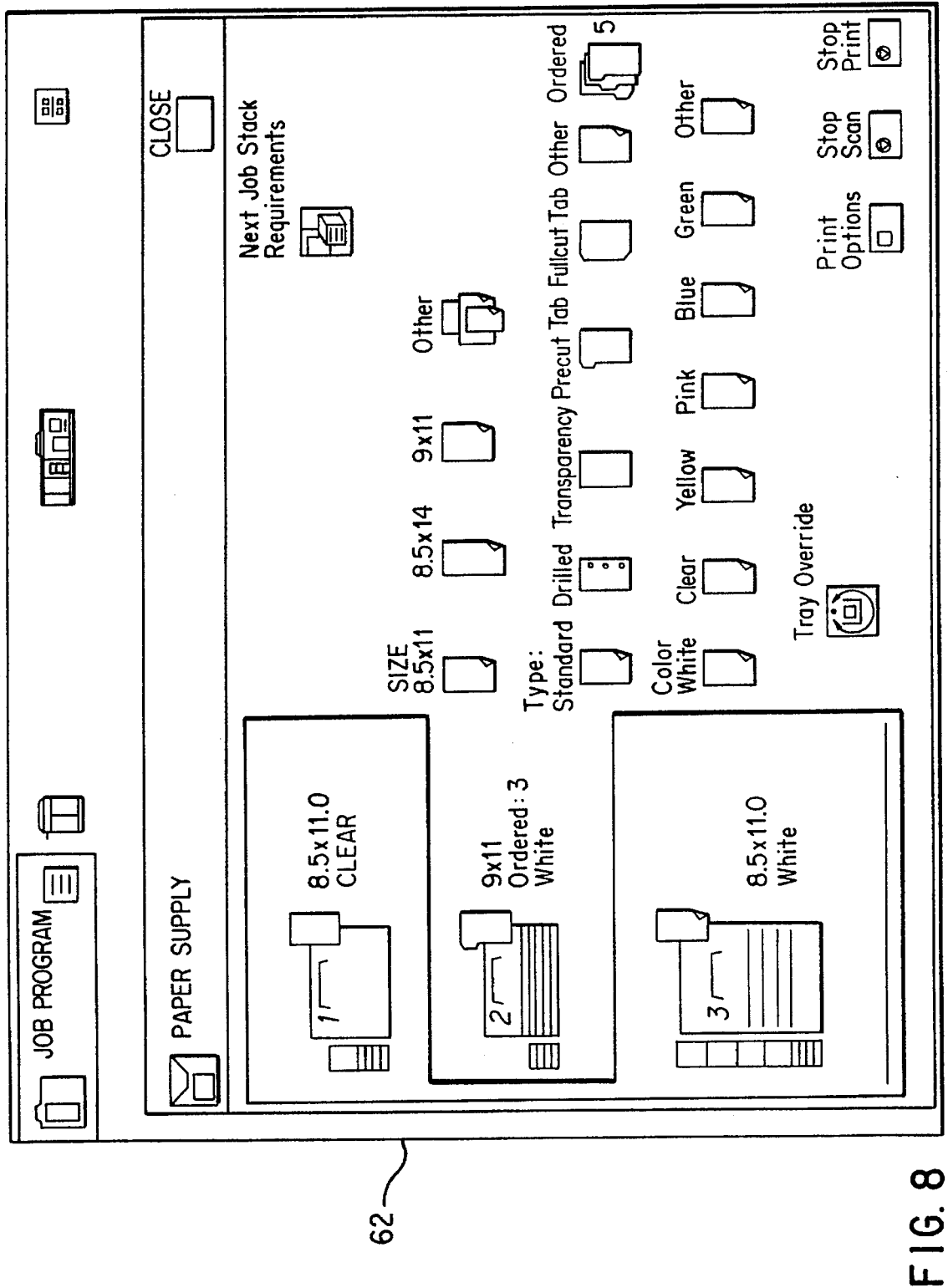
FIG. 8 shows a User Interface touchscreen with precut tabs selected as the output stock.

FIG. 8 shows a screen from the user interface 52 on which a white 9×11 precut tab has been selected. On this paper supply screen can be selected the size, color and type of stock for the print job. The system operator can indicate the location of the precut tabs within the print job by specifying the particular page or page image (pre- or post-scan), or specify the exact number of pages between tabs (the controller 7 including appropriate counters to count the number of copies to determine when a tab is to be printed). The controller can be provided with default parameters relating to the dimensions of the input documents and tab size, or the system operator can specify the stock dimensions before printing.

The size difference between the originals and the tabs is the distance that the image must be shifted onto the tab extensions. This variable image shifting effectively allows the input stock to be scanned from original documents of one standard size, if desired. For example, if the original pages are 8½×11 sheets and the output stock is to be 8½×11 sheets and 9×11 tabs, the print job can be more efficiently scanned if all the original documents (tab originals included) are scanned from the same size sheets so that two separate scan blocks are not required.

Another benefit of having a size dependent image shift is that it easily allows scanning from documents of different sizes (such as from documents scanned from different modes of the printing system). For example, the system operator may prefer to scan from one mode, such as the Recirculating Document Handler (RDH), shift to the platen mode, feed to the Semi Automatic Document Handler (SADH), return to the RDH, etc. Since the images from the tab originals are stored digitally, the mode by which the originals are scanned can thus be varied, and the documents only have to be scanned once during a print job. It is thus more desirable for the scanned images to be shifted a variable distance depending upon the dimensions of the original and output documents, (rather than shifting standard preselected distance, for example) since scanning from different modes would allow the input documents to be of different sizes.

Figure 9:
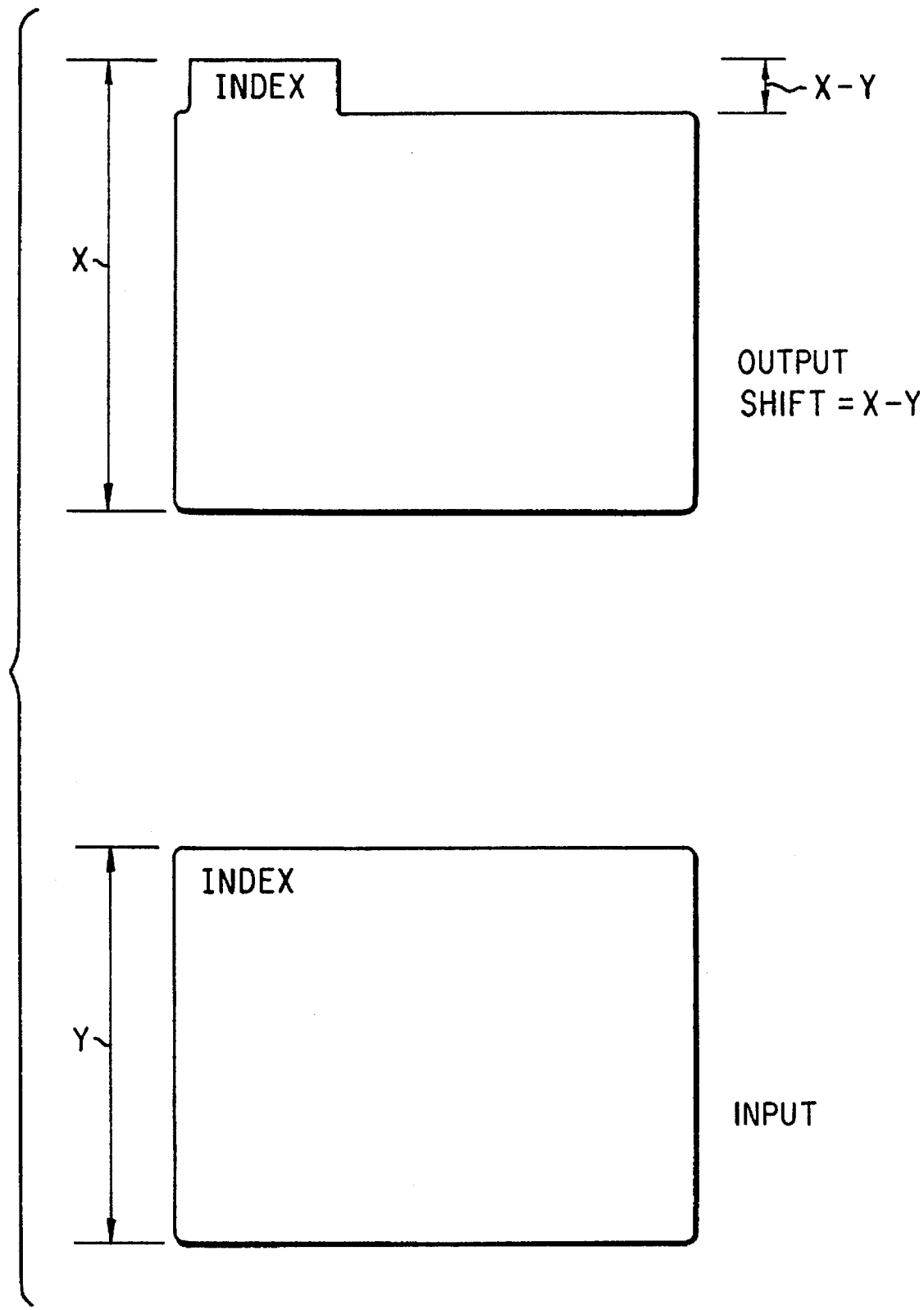
FIG. 9 shows an image shift on a precut tab, the image shifted to the right a distance equal to the difference in width of the original document and the tab.
Figure 10:
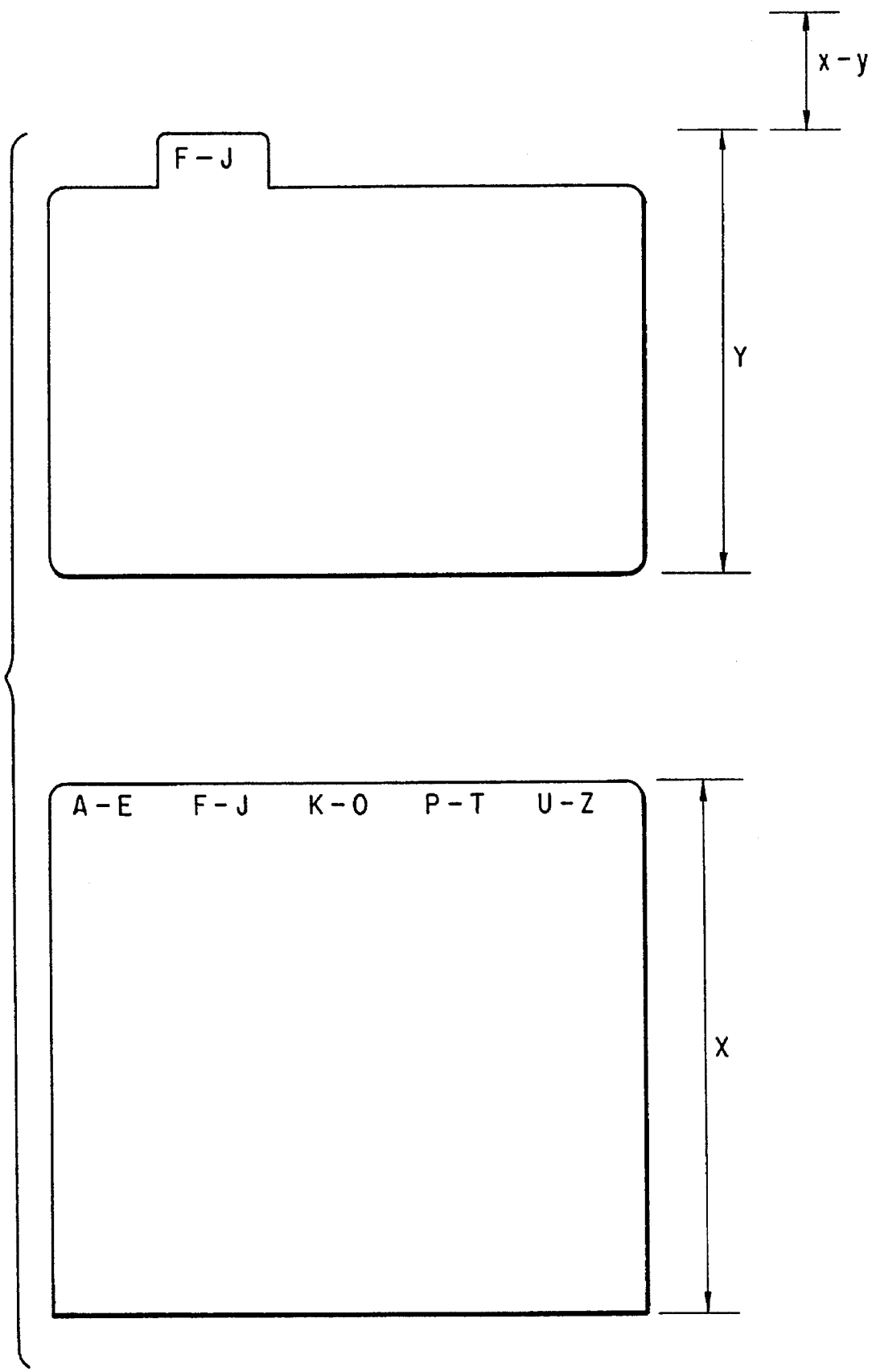
FIG. 10 shows an image shift on a precut tab, the image shifted to the left a distance equal to the difference in width of the original document and the tab.

Thus, if printing on a tab, for example, to ensure that the image on the tab is in the proper location, instead of the controller shifting a page image a standard preselected distance, the difference is calculated as the difference between the input and output stock sizes, and the image is shifted by the controller accordingly. As an example, in FIG. 9, if the document description (e.g. the width x of the original document) is smaller than the tab width y on which the scanned images will be printed, then the images will be shifted by the controller 7 to the right a distance equivalent to the difference between the width of the two documents (x-y). On the other hand, as in FIG. 10, if the document description width x is wider than the tab width y, then the images will be shifted by the controller 7 to the left. When the controller 7 calculates the automatic variable image shift, the last selected document description or crop size and paper stock will be used for this calculation.

The automatic image shift for tabs can be used in conjunction with an image shift applied for an entire print job. Thus, a standard image shift for a print job can be used in conjunction with the automatic image shifting, such as described herein, with the variable shift taking precedence over the standard print job image shift. The system operator can respecify the job image shift for a tab by reprogramming the image shift. If the tab stock selection is inactivated, the automatic image shift for tabs will be removed only if the operator has not changed the amount of image shift for the tab. Thus, if the tab image shift was altered by the system operator, then the altered image shift will remain.

The invention is equally applicable to differences in document height with corresponding vertical image shifts. The invention has also been described as being applicable to printing on tabs, however the image shift is adaptable to any output stock that might dimensionally differ from the rest of the print job.

Additionally, other methods of identifying which original document image is to be variably shifted are envisioned, such as by specifying the page number of the original document image or by automatically determining the image shift from an electronically readable code. Further, the invention has been described as being applicable to shifting electronic images that have been created by scanning directly at a scanner at the reprographic system location. However, the invention is adaptable for use with a networked reprographic system having remote user work stations.

C. Image Proofing

Once the system operator has scanned and stored images and specified tab output stock for printing the image, or has scanned the entire scan block and selected via UI 52, particular electronic images to be printed on tab stock, the system operator can operate the system to proof the document. In the past, this action would cause the system to indicate that proofing is unavailable due to the size of the output stock required. According to the invention, however, the system operator can proof the printing of images requiring tab stock.

Figure 11:
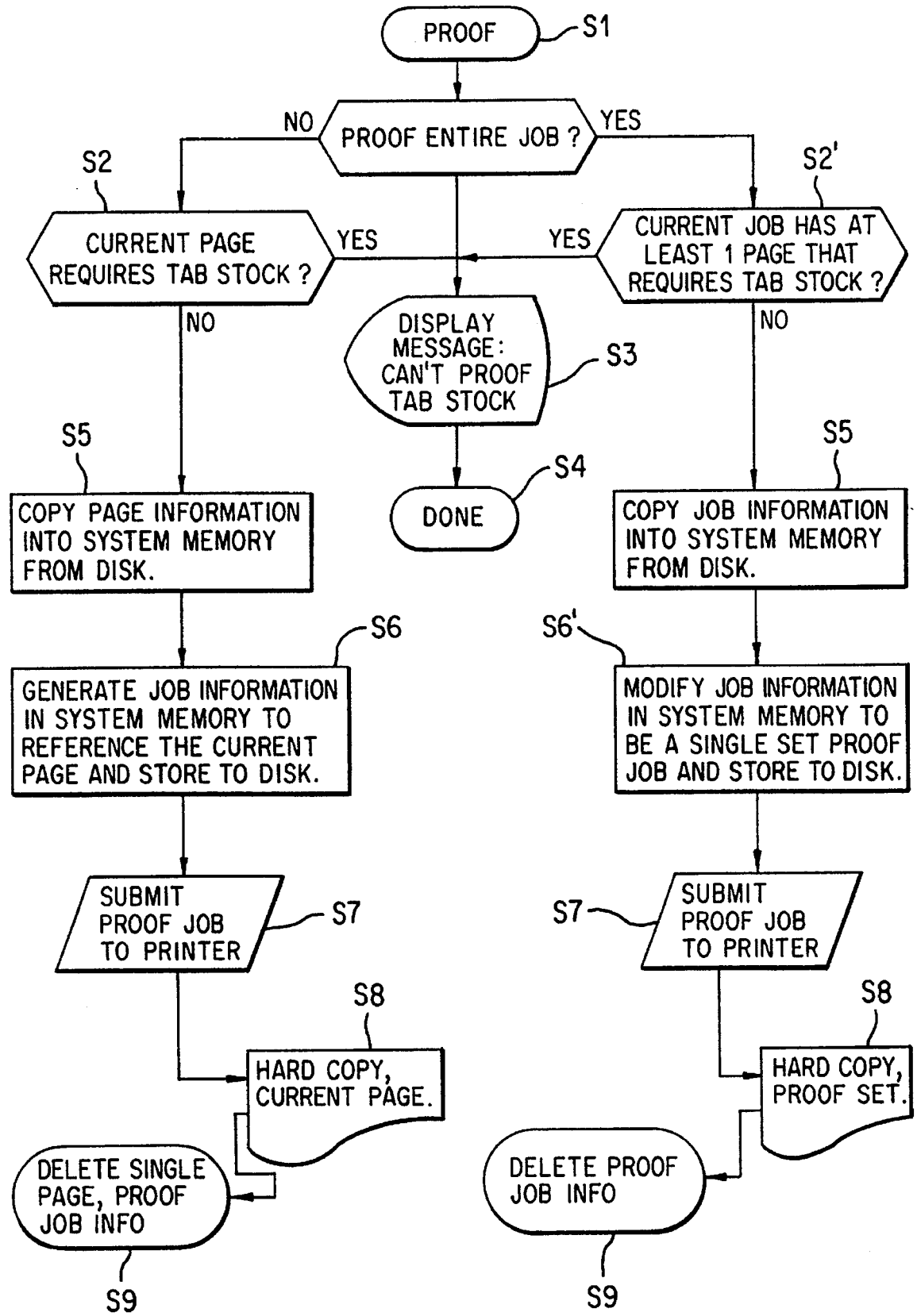
FIG. 11 shows a flowchart of the conventional proofing.

FIG. 11 shows a flow chart of the conventional proofing of images. In FIG. 11, once the proof mode (S1) is selected, if the print job has at least one image for printing on tab stock (S2 and S2'), a message is displayed (S3) at the UI 52, for example, a light or a readout, indicating that the image requiring printout on tab stock cannot be proofed and the proof job is aborted (S4). Accordingly, in the conventional arrangement, if the print job does not include an electronic image for printout on tab stock, the print job can be proofed. Proofing of images requiring printing on standard stock includes copying stored images from main memory 56 into system memory 61 (S5). In system memory 61, the print job is modified to be a single proof job (S6') or to reference the current image (S6). The single proof job or single image is stored in main memory 56 (S6 and S6'), submitted to printer section 8 (S7) and printed on output sheets (S8). The electronic images in the single proof job are then deleted from main memory 56 (S9).

Figure 12:
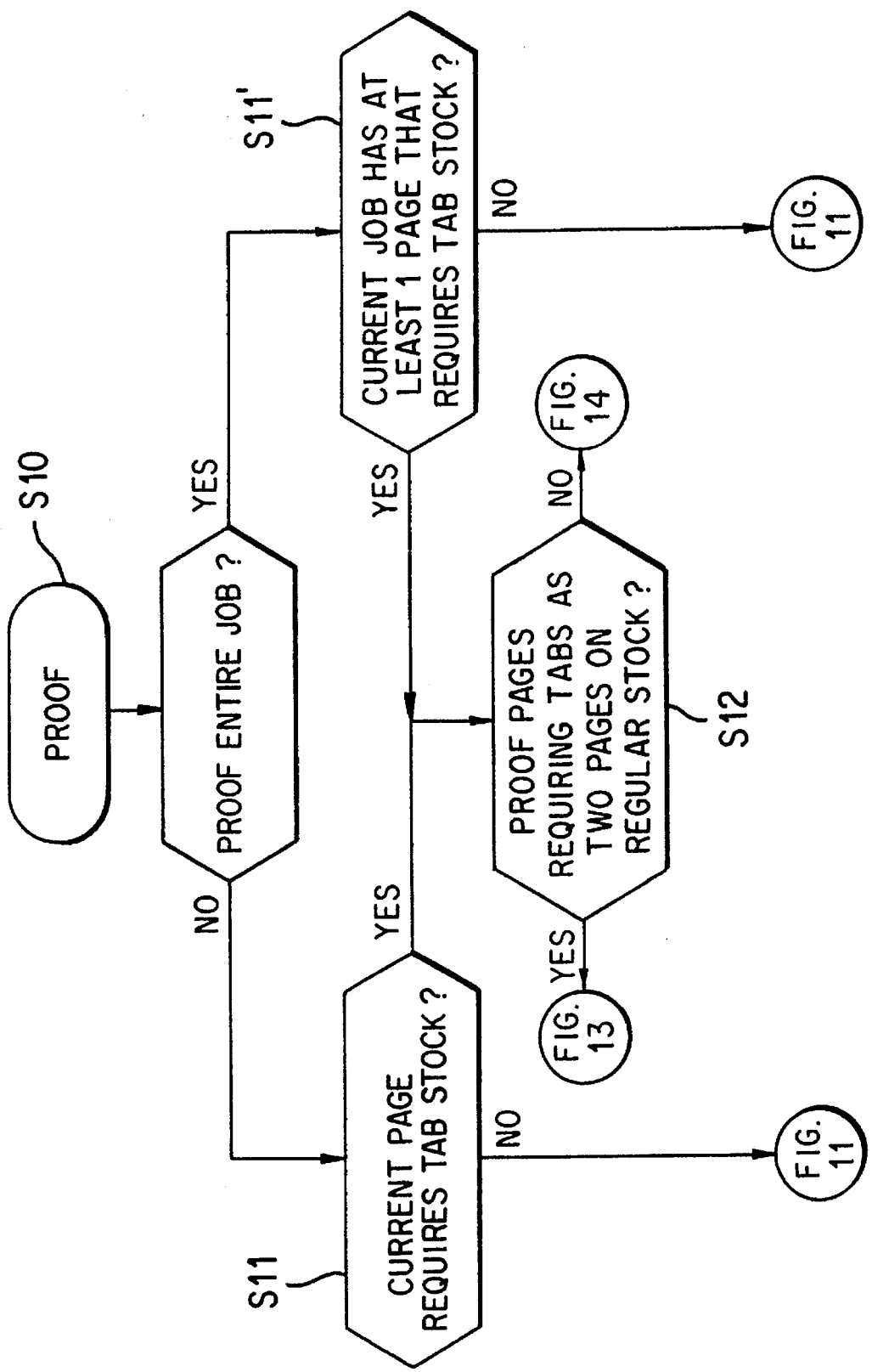
FIG. 12 shows a flowchart of the proofing in accordance with the invention.

In accordance with the present invention, proofing of images requiring printing on tab stock will be described with reference to the flow charts depicted in FIGS. 12–14. After selecting the proof mode (S10) and determining that at least one of the images requires printout on tab stock (S11 and S11'), the operator selects to proof the image on either one or two pages of standard output stock (S12).

Figure 13:
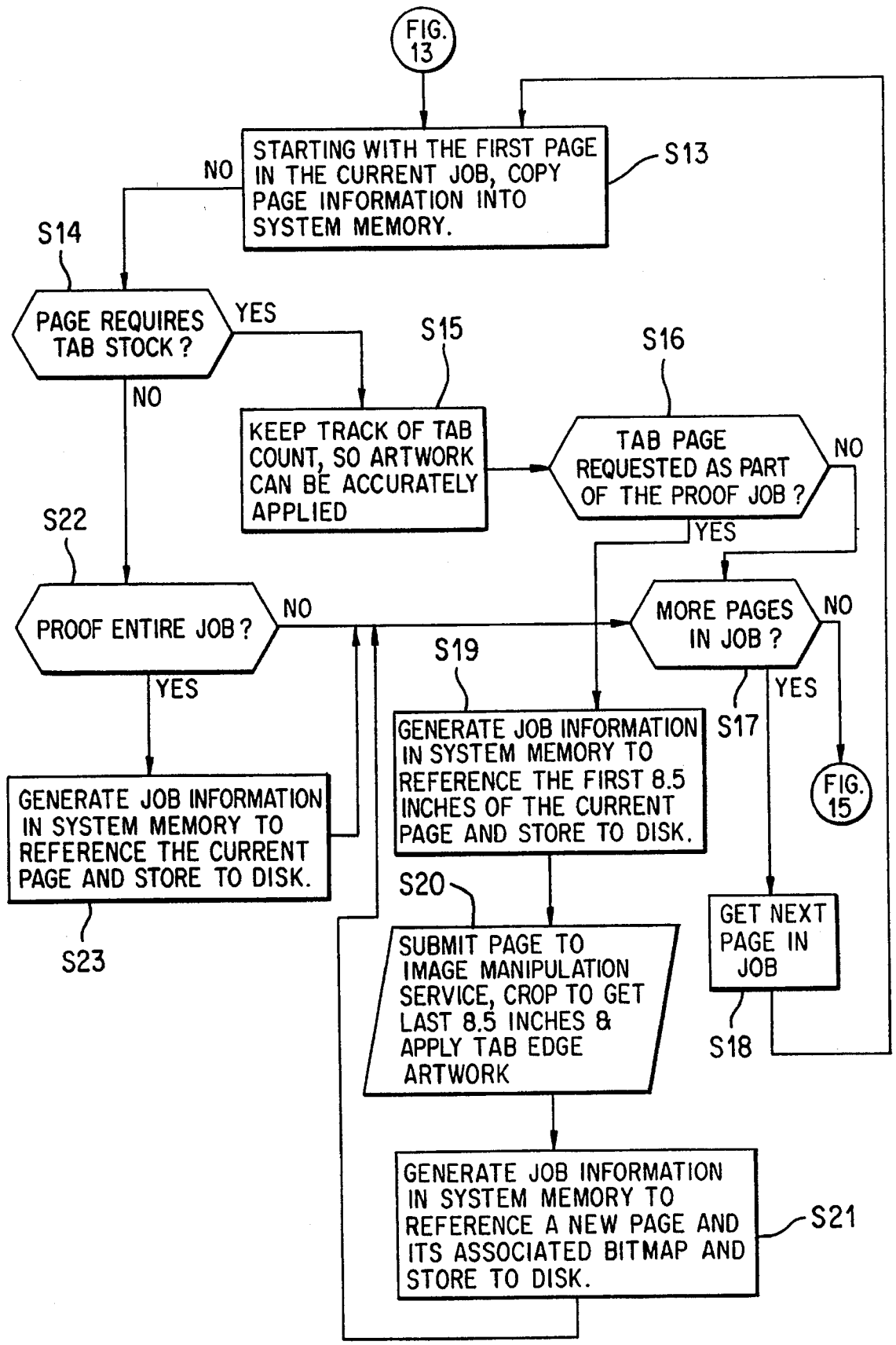
FIG. 13 shows part A of the flowchart in FIG. 12 for proofing on two sheets of standard output stock.

FIG. 13 shows the operation of proofing the images in accordance with the invention on two sheets of standard output stock. The image specific information for each image (see previous description of image specific information) in a print job is copied in a sequence into system memory 61 as shown in (S13). In particular, the height and width of the document in pixels and the segmentation of the image into slices N scanlines wide are stored. The system then determines whether the image requires tab stock (S14). Then, system memory 61 has machine Operating System software programmed to store a sequential count (S15) of the images that require printing on tab stock. This sequence is stored so that tab-edge artwork (described hereinafter) can be applied to indicate the location of a tab area. Then, it is determined whether the image requested is part of the proof job (S16). If not, the system continues through the images in the job (S17, S18). If yes, then each tab image for proofing has two new images generated as shown in (S19, S20). As shown in (S19), the first part of the image is distinguished. The image specific information in system memory 61 corresponding to the image is further processed to reference a first width of the image. This first width preferably corresponds to the width of the standard output stock, which is 8.5 inches and is therefore the first 8.5 inches of the image. This first part of the image is stored to disk in main memory 56.

As shown in (S20) of FIG. 13, the image is processed to form a second part of the image. In this step, the image is accessed in main memory 56 and transferred to image manipulation section 58 for processing. Image manipulation section 58 crops the image, thereby forming a second part of the image. The second part is preferably the last 8.5 inches of the width of the image. Further, image manipulation system 58 utilizes single page bitmaps and/or graphics to apply tab-edge artwork 214. Image manipulation system 58 is programmed to apply tab-edge artwork 214 in accordance with the particular tab stock selected for printing and with the position of the tab being printed. Tab-edge artwork 214 outlines tab area 216 by printing over the area on the standard output stock that is the area cut-off on the tab stock. Image manipulation system 58 accesses main memory 56 for information regarding the particular cut of tab stock that is being used and the position of the tab being printed. For example, a one-third cut tab stock means three tabs fit along a length of a standard piece of tab stock that has dimensions of 9 inches by 11 inches. Each tab in a one-third cut tab stock is therefore ½ of an inch wide by 3⅓ inches long.

As shown in (S21), the information for the second part of the image is generated in the system memory and stored as a new, second part image having specific information and with an associated new, second part image bitmap. Finally, when the image in (S14) does not require tab stock, then it is determined (S22) whether the entire job will be proofed. If yes, then that image is stored to disk (S23), and if not, then the system continues on to the next image (S17).

Figure 16:
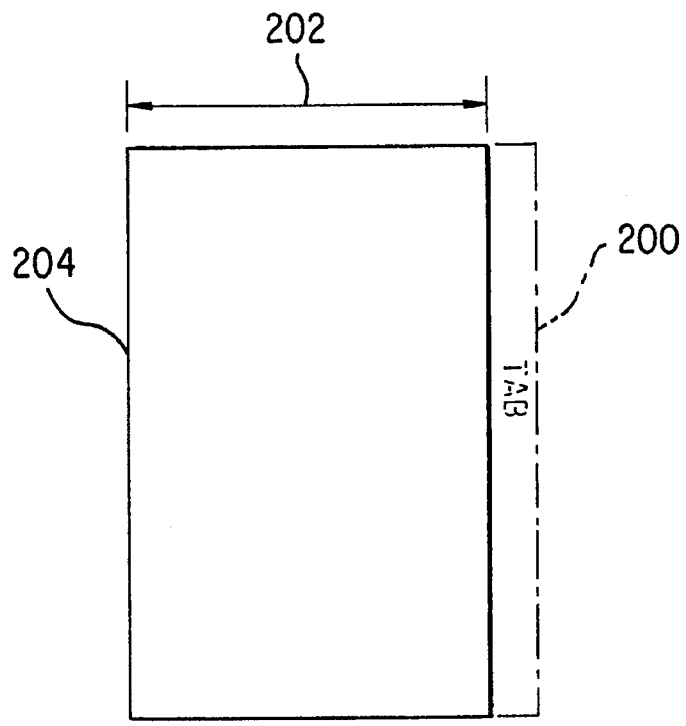
FIG. 16 shows an output sheet with a first part of the tab image printed on the output sheet.
Figure 17:
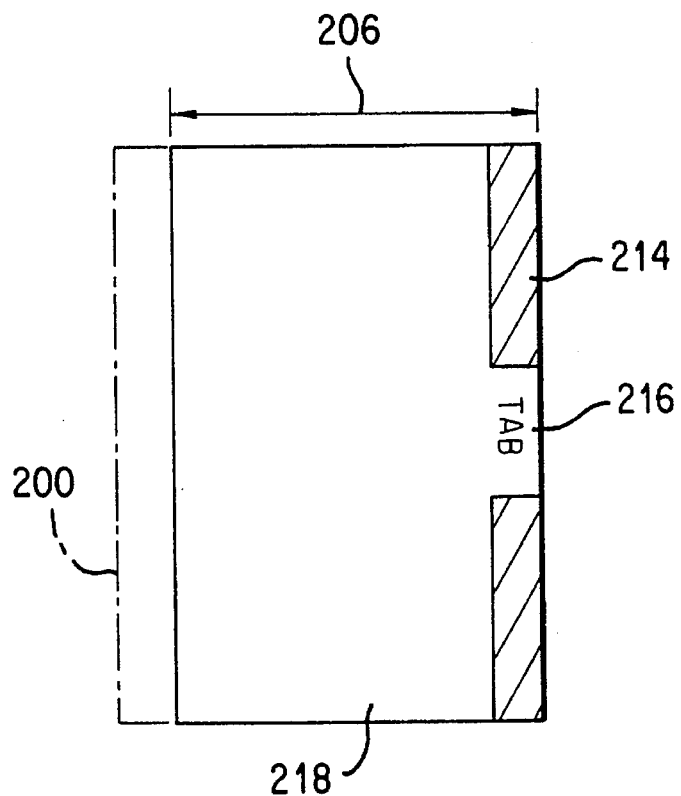
FIG. 17 shows an output sheet with a second part of the tab image printed on the output sheet and including tab-edge artwork.

To illustrate the layout of the two standard output sheets, FIG. 16 shows an image 200 for printing on tab stock. Referring to FIGS. 16 and 17, the image 200, in accordance with one embodiment, is printed on two sheets of standard output stock to proof a single image 200. On a first sheet 204 of standard output stock, a first part 202 of image 200 is printed. On a second sheet 218 of standard output stock, a second part 206 of image 200 is printed. Tab-edge artwork 214 is applied to show tab area 216.

To create a full view of image 200, the system operator can coordinate the first and second sheets 204 and 218, thereby having first and second parts 202 and 206 line up to create a printout of image 200.

Figure 14:
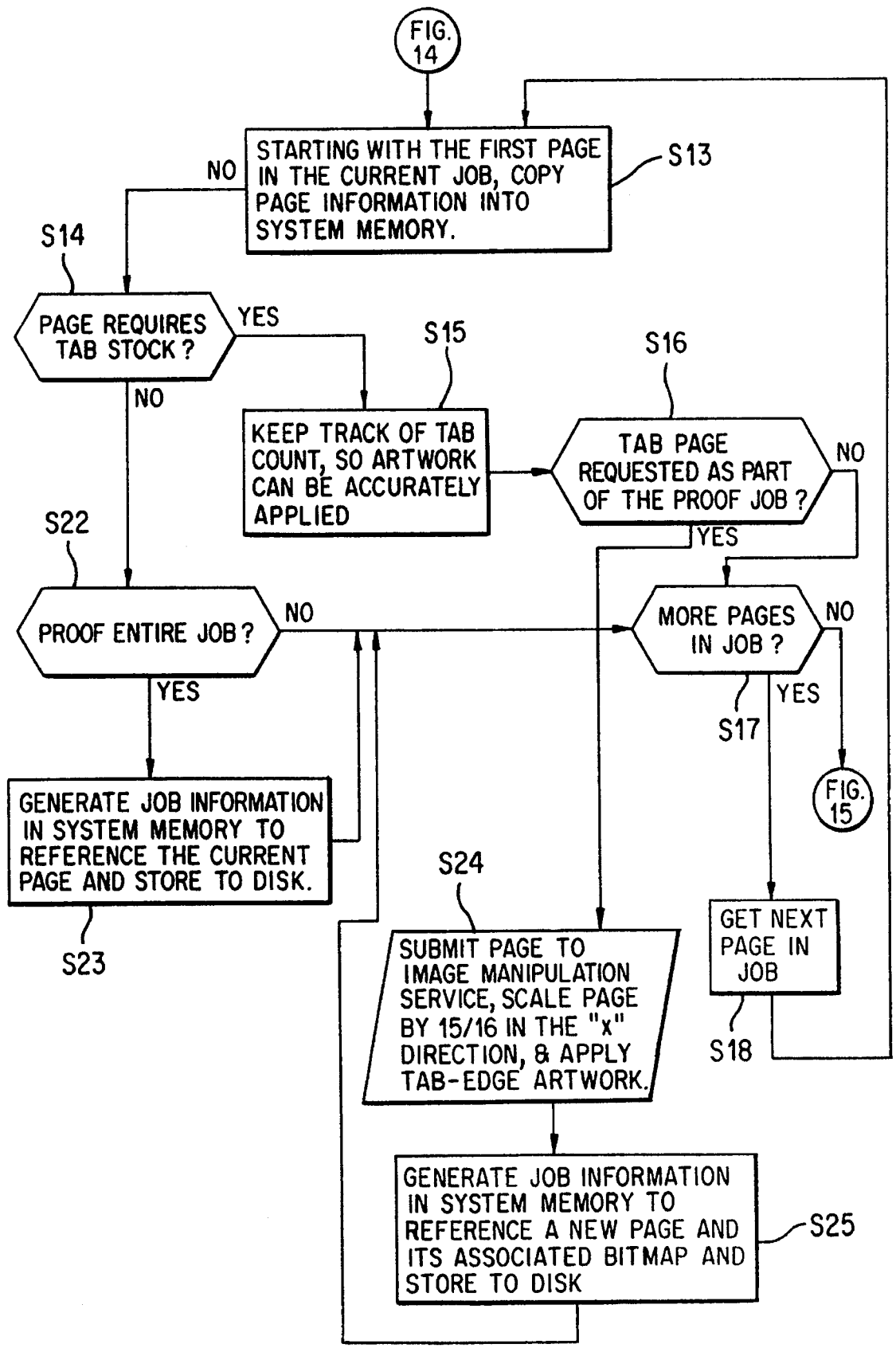
FIG. 14 shows part B of the flowchart in FIG. 13 for proofing on a single sheet of standard output stock.

In another embodiment, shown by a flowchart in FIG. 14, images requiring tab stock are proofed on a single standard output sheet. All the steps are the same as in the FIG. 13 embodiment until it is determined that the image requiring tab stock is part of the proof job (S16). If (S16) is yes, then, as shown in (S24), for each image to be proofed as part of the proof job, the image is transferred to image manipulation section 58. The bitmap for the image is then scaled in an axial direction. For an image requiring printing on tab stock, the bitmap for the image must be scaled by $15/16$ in a direction along the x axis to fit entirely on a sheet of standard output stock. Scaling is accomplished by a known process. For purposes of illustration, in scaling by $15/16$, every 16th scanline in an image is skipped, thereby narrowing the width for printing on standard output stock. As (S25) shows, tab edge artwork is stored in an associated bitmap to indicate the tab area and location when printed on a standard size sheet. Image specific information is generated for the scaled image in system memory 61. Accordingly, a new scaled proof image, with an associated new scaled proof bitmap, is stored to disk in the main memory 56.

Figure 18:
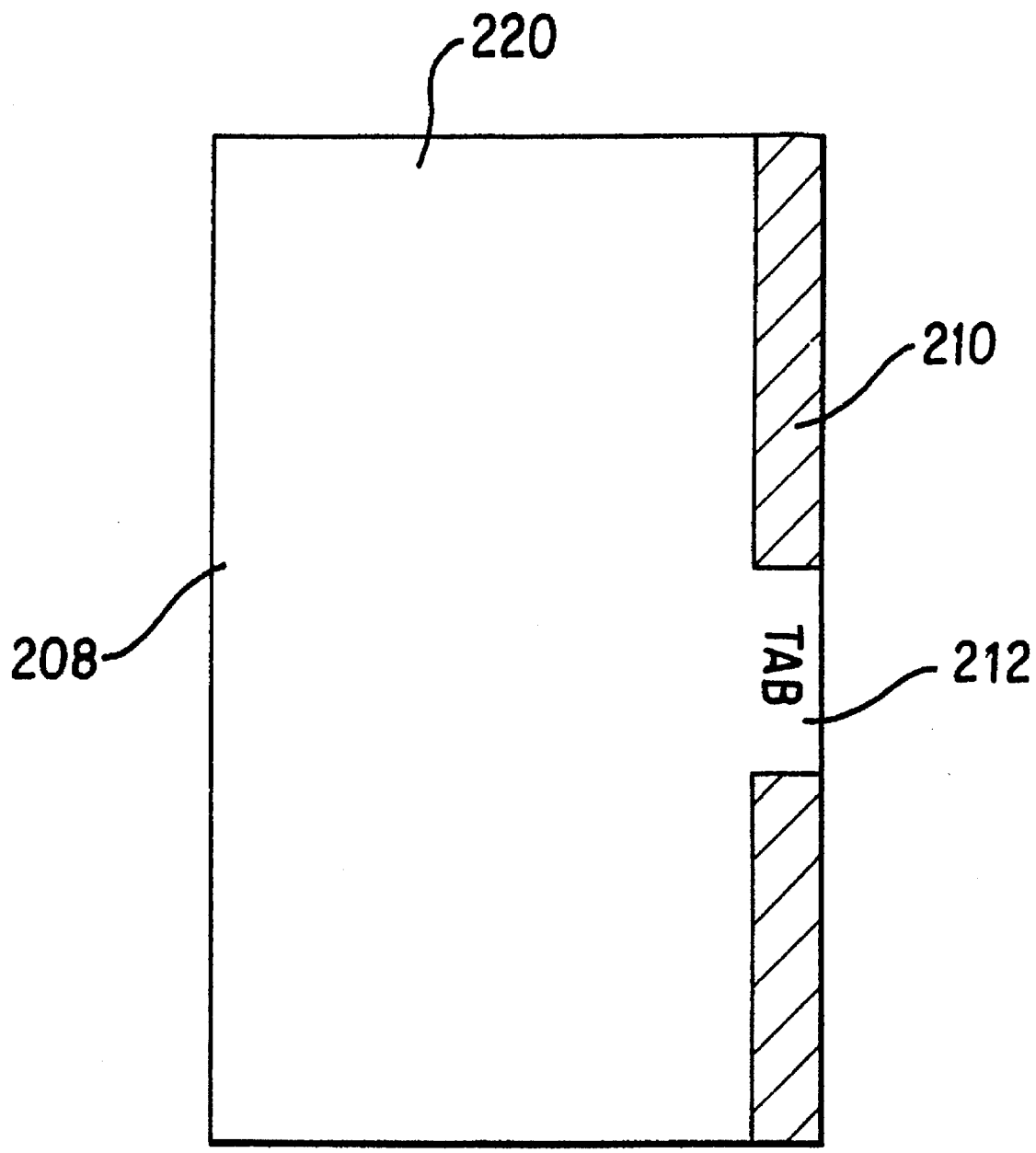
FIG. 18 shows an alternate embodiment of a single output sheet with the tab image scaled and printed thereon.

Referring to FIG. 18, by scaling a width of image 200 by a factor of $15/16$, scaled image 208 is contained on single sheet 220 of standard output stock for proofing. Scaled tab-edge artwork 210 is applied to show scaled tab area 212.

Figure 15:
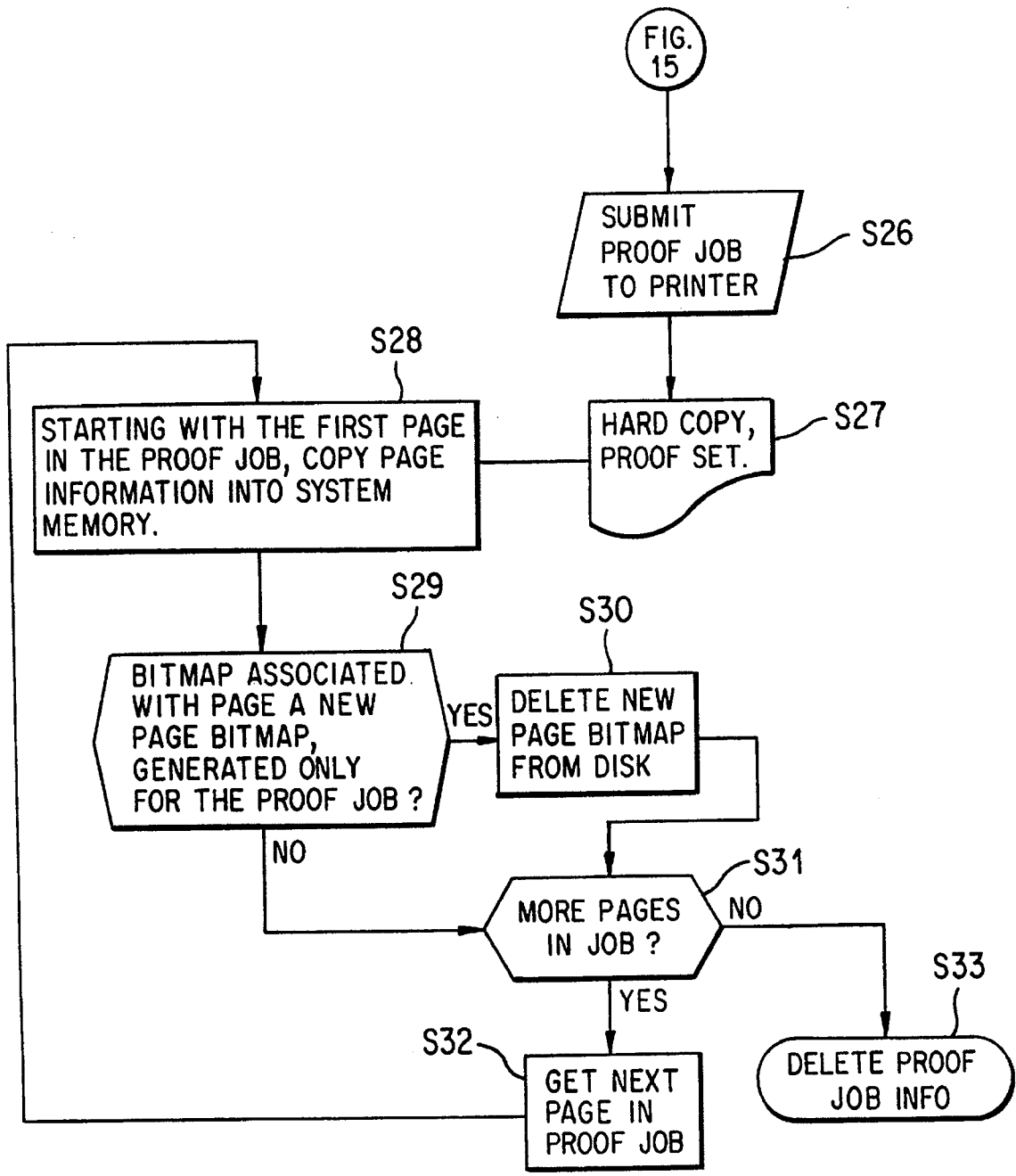
FIG. 15 shows part C of FIGS. 13 and 14 for printing in accordance with the invention on standard output stock.

FIG. 15 shows, with respect to either embodiment for proofing tab image 200 on standard output stock, submitting the proof job to printer section 8 (S26) for printing a hard copy proof set (S27). Then, each proof image with its respective information and bitmap is copied into system memory 61 (S28, S29). If the proof image bitmap is generated only for purposes of proofing (S29), then it is deleted from the disk in main memory 56 (S30). If there are more images in the proof job (S31), the system continues to the next page (S32). If not, the system deletes the proof job information (S33).

It is within the scope of the invention that the embodiment for printing on two sheets of standard output stock can accommodate varying tab stock. By adjusting the tab stock information, image manipulation 58 and system memory 61 are adapted to print the desired parts of the image to be proofed and create the associated bitmap so that the tab-edge artwork will be accurately located.

While advantageous embodiments have been chosen to illustrate the invention, it will be understood by those skilled in the art that various changes and modifications can be made therein without departing from the scope of the invention as defined in the appended claims.

What is claimed is:

1. A method for proofing images requiring printing on tab stock, comprising the steps of:

selecting a proof mode;

supplying image data upon selection of said proof mode, the image data comprising at least one image requiring printing on tab stock;

modifying said at least one image for printing on at least one sheet of standard size output stock; and printing the modified image on at least one sheet of standard size output stock.

2. The method for proofing images according to claim 1, wherein the modifying step comprises the steps of:

identifying a first part of the at least one image;

storing said first part of the at least one image;

cropping a second part of the at least one image; and storing said second part of the at least one image to memory.

3. The method for proofing images according to claim 2, wherein said first part is a first 8½ inches of said at least one image.

4. The method for proofing images according to claim 2, wherein said second part is a second 8½ inches of said at least one image.

5. The method for proofing images according to claim 3, wherein said second part is a second 8½ inches of said at least one image.

6. The method for proofing images according to claim 5, wherein said standard size output stock is 8½×11 inches.

7. The method for proofing images according to claim 2, wherein said printing step comprises the steps of:

printing said first part of the at least one image on a first sheet of said standard size output stock; and printing said second part of the at least one image on a second sheet of said standard size output stock.

8. The method for proofing images according to claim 1, wherein the modifying step comprises the steps of:

scaling the at least one image by a predetermined amount; and storing the scaled at least one image.

9. The method for proofing images according to claim 8, wherein said printing step comprises the step of printing the scaled at least one image on a single sheet of said standard size output stock.

10. The method for proofing images according to claim 9, wherein the standard size output stock is 8½×11 inches.

11. The method for proofing images according to claim 8, wherein the predetermined amount is $15/16$.

12. A method for proofing images requiring printing on tab stock, comprising the steps of:

supplying image data, the image data comprising at least one image requiring printing on tab stock;

identifying a first part of the at least one image;

storing said first part of the at least one image;

cropping a second part of the at least one image;

storing said second part of the at least one image;

printing said first part of the at least one image on a first corresponding output sheet; and printing said second part of the at least one image on a second corresponding output sheet.

13. The method for proofing images according to claim 12, further comprising the steps of:

counting the at least one tab image for proofing; and storing said counted at least one tab image in a sequential order.

14. The method for proofing images according to claim 12, wherein the step of processing a first part of said tab image comprises processing a first 8.5 inches of said tab image.

15. The method for proofing images according to claim 12, wherein the step of cropping further comprises cropping a second 8.5 inches of the tab image.

16. The method for proofing tab images according to claim 12, further comprising the step of indicating a tab area on at least one of the first and second corresponding output sheets.

17. The method for proofing images according to claim 12, wherein said corresponding output sheet is 8½×11 inches 18. A method for proofing images requiring printing on tab stock, comprising the steps of:
   selecting a proof mode;
   supplying image data upon the selection of said proof mode, the image data comprising at least one image requiring printing on tab stock;
   scaling the at least one image by a predetermined amount;
   storing the scaled at least one image; and
   printing the scaled at least one image on a standard size output sheet.

19. The method for proofing images according to claim 18, wherein the step of proofing further comprises scaling said image in an axial direction.

20. The method for proofing images according to claim 18, wherein the step of proofing comprises scaling said image by $15/16$ in an axial direction.

21. The method for proofing images according to claim 12, wherein said first and corresponding output sheets are 8½×11 inches.

22. An electronic reprographic printing system for printing an output sheet of a print job, comprising:
   means for storing a print job comprising at least one tab image requiring printing on tab stock;
   means for selecting output stock, said output stock comprising at least one sheet of tab stock;
   means for proofing the at least one tab image requiring printing on tab stock, said proofing means comprising:
      means for processing a first part of said tab image, said first part being stored in said storing means, and
      means for cropping a second part of said tab image, said second part being stored in said storing means; and
   means for converting the first part of said tab image to a first corresponding output sheet and the second part of said tab image to a second corresponding output sheet.

23. The electronic reprographic printing system of claim 22, further comprising:
   means for counting the at least one tab image for proofing, said counted at least one tab image being stored in said storing means.

24. The electronic reprographic printing system of claim 22, wherein said means for processing a first part of said tab image comprises means for processing a first 8.5 inches of said tab image.

25. The electronic reprographic printing system of claim 22, wherein said means for cropping comprises means for cropping a second 8.5 inches of tab image.

26. The electronic reprographic printing system of claim 22, further comprising means for indicating a tab area on one of the first and second corresponding output sheets.

27. An electronic reprographic printing system for printing an output sheet of a print job, comprising:
   means for storing image data, said image data comprising at least one image requiring printing on tab stock;
   proof mode selecting means for selecting a proof mode; and
   means for proofing the at least one stored image upon selection of a proof mode by said proof mode selecting means said proofing means including means for converting the at least one stored image to a corresponding output sheet.

28. The electronic reprographic printing system according to claim 27, wherein the means for proofing comprises means for scaling said image by $15/16$ in an axial direction.

29. The electronic reprographic printing system according to claim 27, wherein the means for proofing comprises means for scaling said image in an axial direction.

30. An electronic reprographic system for printing an output sheet of a printing job comprising:
   means for storing image data, the image data comprising at least one image requiring printing on tab stock;
   proof mode selecting means for selecting a proof mode;
   means for modifying said at least one image for printing on at least one sheet of standard size output stock when a proof mode is selected by said proof mode selecting means; and
   means for printing the modified image on at least one sheet of standard size output stock.

31. The electronic reprographic system according to claim 30, wherein the means for modifying comprises:
   means for identifying a first part of the at least one image;
   means for storing said first part of the at least one image;
   means for cropping a second part of the at least one image; and
   means for storing said second part of the at least one image.

32. The electronic reprographic system according to claim 31, wherein the means for printing comprises means for printing said first part of the at least one image on a first sheet of said standard size output stock and said second part of the at least one image on a second sheet of standard size output stock.

33. The electronic reprographic system according to claim 30, wherein the means for modifying comprises:
   means for scaling the at least one image by a predetermined amount; and
   means for storing the scaled at least one image.

34. The electronic reprographic system according to claim 33, wherein the means for printing comprises means for printing the scaled at least one image on a single sheet of standard size output stock.

35. The electronic reprographic system according to claim 33, wherein the predetermined amount is $15/16$.

36. A method for proofing images according to claim 1, wherein said step of modifying said at least one image comprises the step of applying tab-edge artwork to the at least one image.

37. The electronic reprographic printing system according to claim 27, wherein said proofing means comprises means for applying tab-edge artwork to the at least one stored image.

* * * * *

UNITED STATES PATENT AND TRADEMARK OFFICE
CERTIFICATE OF CORRECTION

PATENT NO. : 5,519,501
DATED : May 21, 1996
INVENTOR(S) : Robert S. Hamilton

It is certified that error appears in the above-indentified patent and that said Letters Patent is hereby corrected as shown below:

Title page, item [54], and col. 1, the title should read--PROOFING IMAGES IN A PRINT JOB HAVING AT LEAST ONE IMAGE FOR PRINTING ON TAB STOCK--.

Signed and Sealed this

Twenty-fourth Day of September, 1996

Attest:

BRUCE LEHMAN

*Attesting Officer*     *Commissioner of Patents and Trademarks*